Jan. 27, 1970  J. M. DEAN  3,491,596
TEMPERATURE SENSING DEVICE
Filed Oct. 2, 1967  3 Sheets-Sheet 1
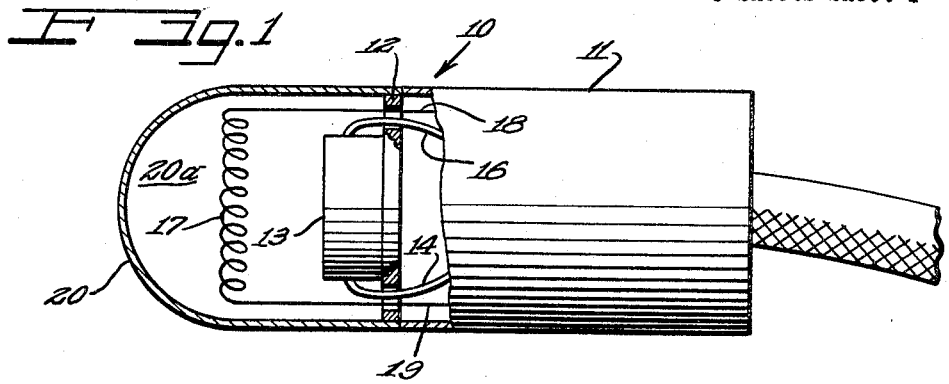
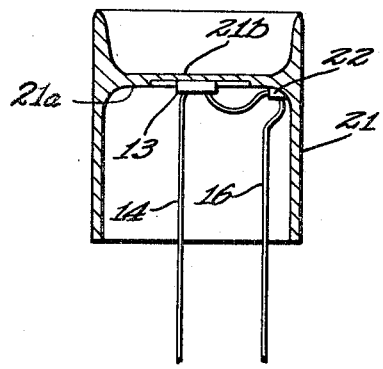
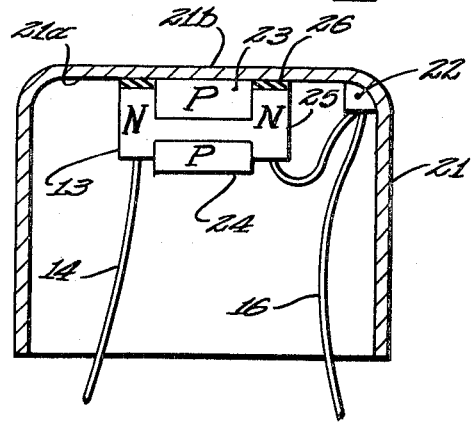
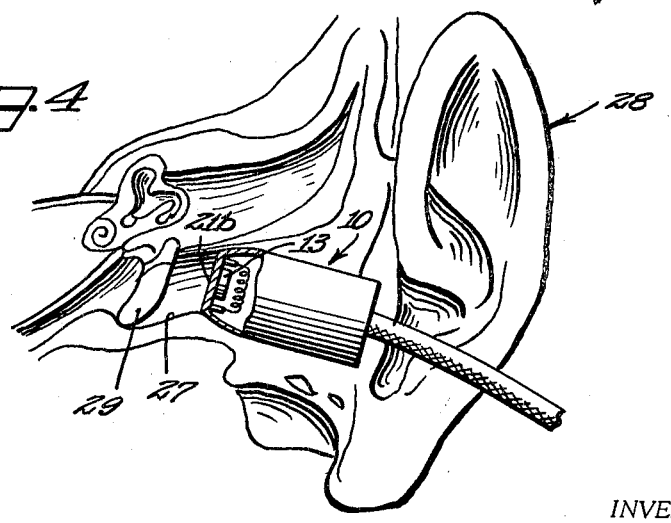
INVENTOR.
James M. Dean Jan. 27, 1970  J. M. DEAN  3,491,596
TEMPERATURE SENSING DEVICE
Filed Oct. 2, 1967  3 Sheets-Sheet 2
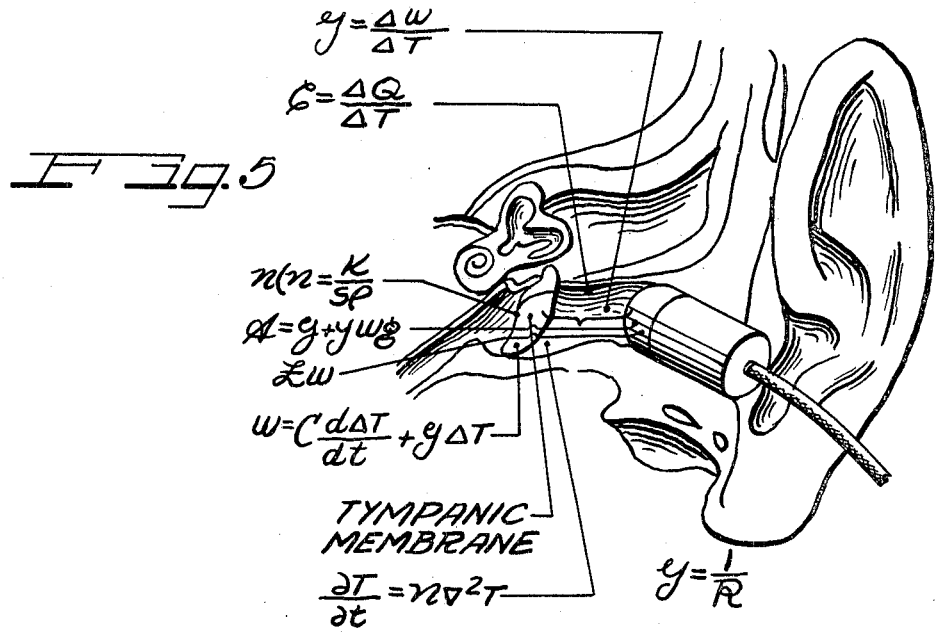
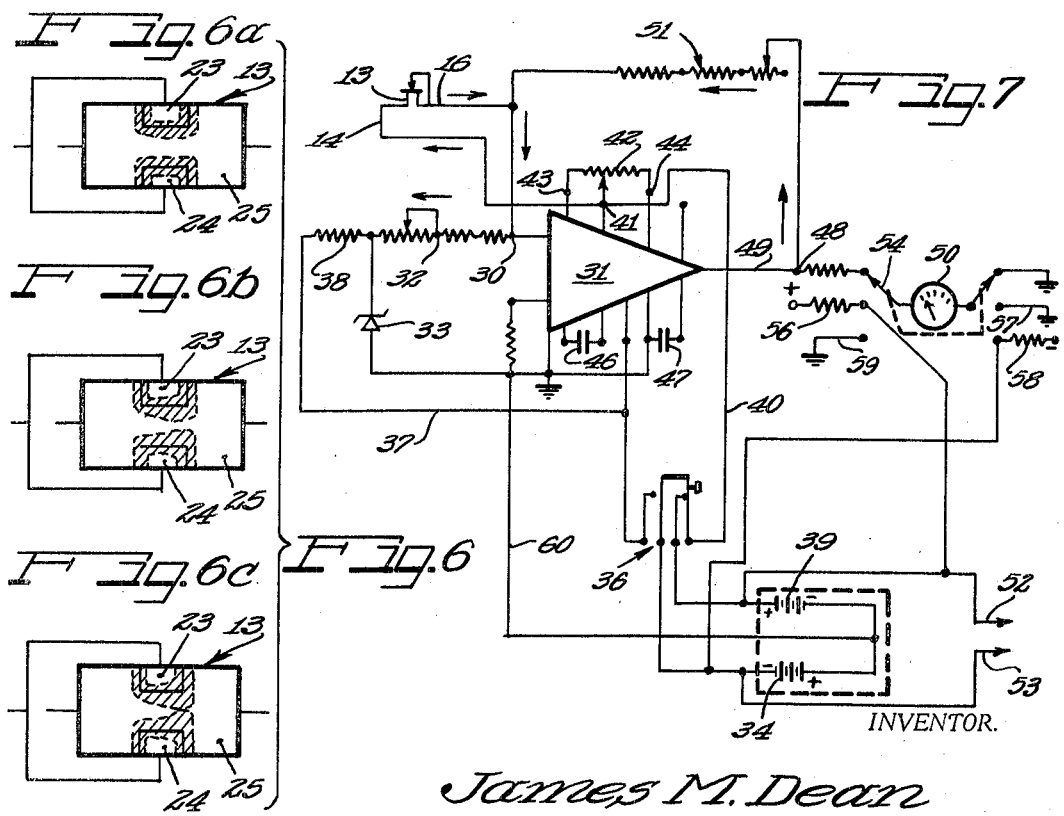
INVENTOR.
James M. Dean
BY *[signature]*  ATTORNEYS

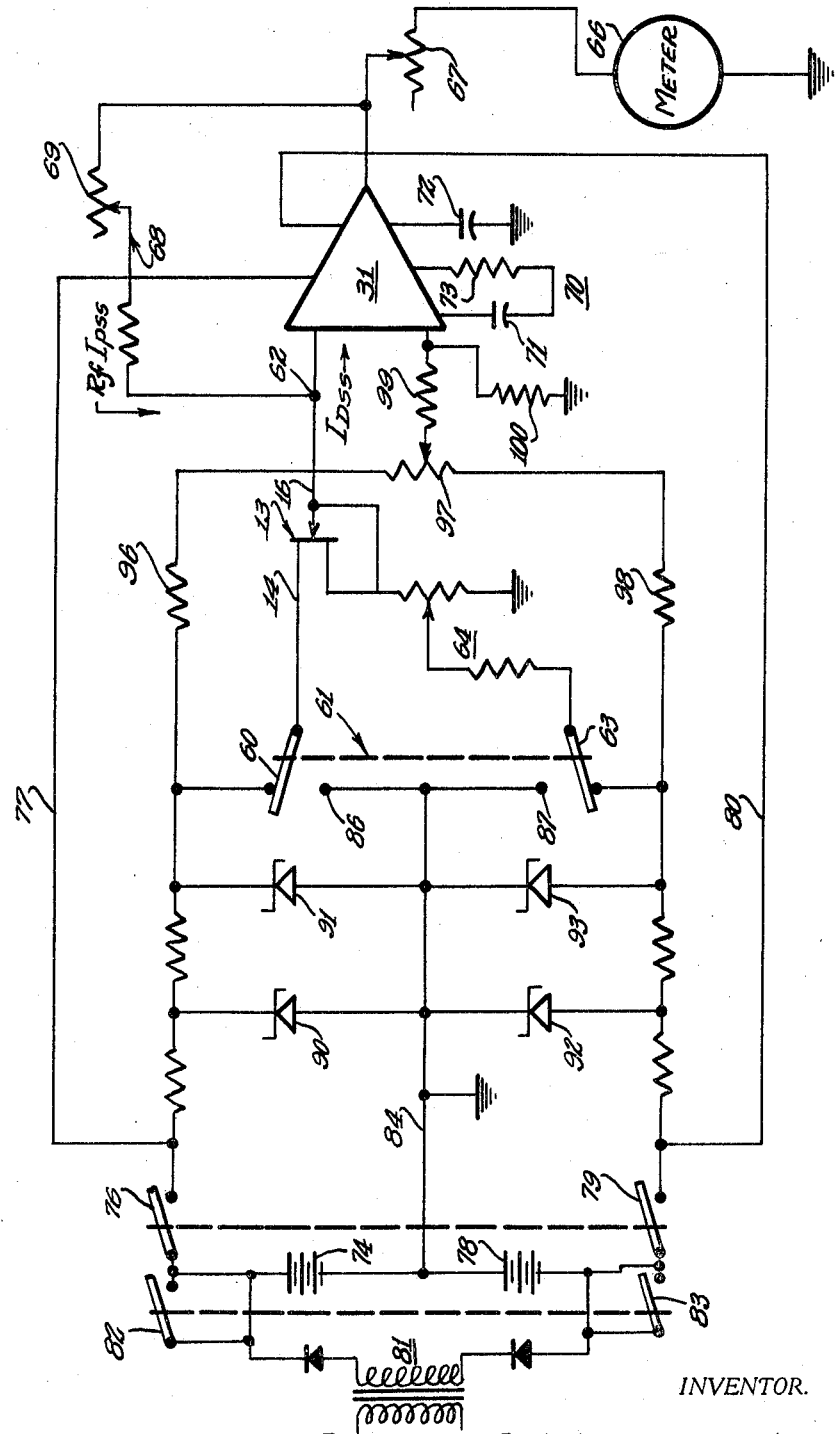

United States Patent Office 3,491,596
Patented Jan. 27, 1970

3,491,596
TEMPERATURE SENSING DEVICE
James M. Dean, Des Plaines, Ill., assignor, by direct and mesne assignments, to Ralph R. Erlich, Michael N. Fine, Charles P. De Vito, and Albert P. De Vito, as trustees
Filed Oct. 2, 1967, Ser. No. 672,204
Int. Cl. G01j 5/24; H01l 15/00
U.S. Cl. 73—355                                9 Claims

ABSTRACT OF THE DISCLOSURE

A temperature sensing device for sensing body temperature of human beings which includes a small probe adapted to be inserted into the ear canal or other convenient part of the body, to receive radiated heat energy from the interior of the ear canal and convert the heat energy into electrical signal information giving an indication of body temperature. The probe contains a field effect transistor which serves to convert the heat energy into electrical signal information. The end of the probe may be parabolic shaped having the focal point thereof adjacent the surface to which the field effect element is secured to concentrate the heat energy in a relatively small area. Also, a heater element may be positioned within the probe to preheat the field effect element to the approximate temperature which is to be measured.

BACKGROUND OF THE INVENTION

Field of the invention

This invention relates generally to temperature sensing devices and more particularly to temperature sensing devices for indicating body temperature of human beings. Specifically, the present invention relates to the use of a field effect transistor which converts radiant heat energy into electrical signal information to give the correct temperature indication.

Since internal body temperature is maintained at a relatively constant value regardless of food intake, exercise, and exposure to ambient extremes of heat or cold, it goes without saying that nature has provided the body with an excellent, although complicated method of thermal regulation. It is known that the skin plays a vital role in this regulatory process, and that one of the important methods whereby the body gains or loses heat is by radiant energy exchange between the skin and its line of sight environmental neighbors. If we stand without clothing in front of a block of ice, we lose heat, whereas we gain if we are exposed to hot objects such as the sun or an open fire. In a typical room ambient of about 75° F., the skin of the palms of the hands facing upwards will measure approximately 92° F. This value is lower than body temperature because the hands are losing heat by radiation to the colder ceiling. If, now, one hand is brought directly above the other with the palms about one inch apart, an immediate rise in skin temperature will be experienced. Since the two hands are at approximately the same temperature, no heat loss by radiant energy exchange takes place, and one senses the actual rise in skin temperature which is caused by the retained body heat which was previously being lost to the ceiling. Some losses still occur, and if the palms are brought still closer to one another, an additional temperature rise will be felt. If the hands are now cupped and held together for an extended period of time, the skin temperature within the cavity will approach that of the body. It is this phenomenon which causes body cavities such as the naval, the inner canthus of the eye, the ear, and skin creases or folds such as the axilla to appear hot on thermograms. Actually, because they are not losing as much heat by radiation, these areas are hotter than the skin areas surrounding them.

It can be shown that every object in nature emits radiant energy as a function of its absolute temperature. Simultaneously, each such object absorbs some portiton of the energy emitted in its direction by every other objects in its direct line of sight. At all times, therefore, every object both emits and absorbs radiant energy. Whether it gains or loses heat by this process, whether its temperature increases or decreases, depends upon whether it absorbs more than it emits, or vice versa. It is this self-emitter radiant energy which is used in the detecting probe of the thermometer.

Description of the prior art

Heretofore, temperature sensing devices have employed thermistor elements which produce a variation in resistance in response to corresponding variations in temperature. Such thermistor elements are usually incorporated in one leg of a bridge circuit which includes a meter or other read-out device connected between the center portions of the parallel legs of the bridge. This type of temperature sensing device may have a response time from thirty seconds to one minute, which is faster than the conventional mercury type of thermometer. However, a need for a temperature sensing device with a response time of, for example, five to ten seconds is needed to facilitate nurses in hospitals to take daily temperature readings more quickly.

SUMMARY OF THE INVENTION

Accordingly, an object of the present invention is to provide a temperature sensing device which gives an accurate indication of the temperature of a body in a relatively short period of time.

Another object of the present invention is to provide a temperature sensing device utilizing as the temperature transducer element a field effect transistor element which is secured to the interior of a relatively small probe.

Yet another object of the present invention is to provide a temperature sensing device which utilizes a field effect transistor element and which can be connected to a conventional amplifier circuit or other conventional circuitry to operate a read-out device.

Another object of the present invention is to provide a temperature sensing device wherein the temperature probe of the device includes a heater element to preheat the temperature transducer element to the approximate temperature to be sensed by the element, thereby reducing the response time of the device.

A still further object of the present invention is to provide a temperature sensing device which is relatively compact in size, inexpensive to manufacture and which is highly efficient due to the relative small number of components in the device.

BRIEF DESCRIPTION OF THE DRAWINGS

FIGURE 1 is an enlarged elevational sectional view of a heat sensing probe constructed in accordance with the principles of this invention;

FIGURE 2 is an elevational sectional view of an alternate embodiment of the heat sensing probe of FIGURE 1 and is constructed in accordance with the principles of this invention;

FIGURE 3 is an enlarged elevational sectional view of the probe of FIGURE 2 showing the detailed construction of the field effect element within the probe;

FIGURE 4 is an elevational sectional view showing the probe of FIGURE 1 or 2 within the ear cavity of a human being to sense the tympanic member temperature;

FIGURE 5 shows the mathematical analysis and schematic representation of the detector and temperature at the tympanic member of the human ear;

FIGURE 6 is a series of schematic representations showing the operation of a field effect transistor element as used in accordance with the principles of this invention;

FIGURE 7 is a schematic diagram showing one form of the circuit arrangement of the temperature sensing device of the present invention; and FIGURE 8 is a schematic diagram showing another form of the circuit arrangement of the temperature sensing device of the present invention.

DESCRIPTION OF THE PREFERRED EMBODIMENTS

It will be understood that like reference numerals throughout the various views of the drawings are intended to designate similar elements or components shown thereon.

Seen in FIGURE 1 is a heat sensing probe constructed in accordance with the principles of this invention and is designated generally by reference numeral 10. The probe includes a hollow tube 11 which has a copper or gold end mounting plate 12 secured thereto.

According to the present invention, a field effect transistor element 13 is secured to the mounting plate 12 in such a manner as to provide maximum heat transfer between the field effect element 13 and the plate 12. A unique feature of the present invention is the fact that the gate of the field effect transistor is directly connected to the source thereby requiring only two leads 14 and 16 connected thereto. The leads 14 and 16 extend through the mounting plate 12 and through the cylindrical tube 11.

A heater element 17 is positioned in proximity to the field effect element 13 and is used to heat the field effect element 13 to the approximate temperature which is to be measured should such approximate temperature be known. For example, when the device is used to take body temperature, the heater element 17 may be used to preheat the field effect element 13 to approximately 98° whereafter the body temperature will raise the temperature of the field effect element 13 or lower its temperature according to the body temperature. The heater 17 is connected to a pair of leads 18 and 19 which extend through the mounting plate 12 and through the cylindrical tube 11 to be selectively connected to a source of energizing current.

A dome-like cover 20 is secured to the mounting plate 12 around the periphery thereof to provide an air tight chamber 20a around the field effect element 13 and the heater element 17. The cover 20 is secured to the end plate 12 in such a manner as to provide maximum heat transfer between the cover 20 and the plate 12.

An alternate embodiment of the probe 10 is shown in FIGURE 2. The probe includes a formed cover 21 which may be secured to the end of the probe to house the field effect element 13. In this embodiment, the field effect transistor is secured directly to the inner face 21a of the cover 21 such that the gate junction of the field effect transistor is in electrical contact with the cover 21. In the preferred embodiment the cover 21 is made of copper, but it will be understood that the cover may be constructed of any electrically conductive material. By placing the field effect transistor 13 directly on the inner face 21a of the cover 21 radiant heat energy impinging upon the outer face surface 21b is efficiently transferred to the field effect element to give accurate temperature indications. The leads 14 and 16 extend from the field effect element 13 in substantially the same manner as shown in FIGURE 1 with the exception being that the lead 14 is electrically connected to a terminal block 22 positioned within the interior of the cover 21. By connecting the lead 16 to the terminal block 22, which, is in direct electrical connection with the cover 21, the gate junction of the field effect transistor is short circuited to the source junction thereof. The outer face 21b of cover 21 may be formed into a concave curve so that it concentrates energy on the field effect element 13.

Seen in FIGURE 3 is an enlarged sectional view of the temperature sensing probe shown in FIGURE 2. The field effect transistor 13 includes a pair of P type junctions 23 and 24 which are formed on opposite sides of N type junction 25. Dielectric material 26 is positioned between the inner face 21a and the end type junction 25 to prevent the junction 25 from becoming electrically in contact with the cover 21. The side of the N type junction connected to the lead 14 is the drain of the field effect transistor and the side of the junction 25 connected to the lead 16 is the source. Therefore, the gate junction, formed by the P type junction 23 is short circuited to the source by means of the cover 21.

FIGURE 4 is a diagrammatic representation of the probe 10 positioned within an ear canal 27 of an ear 28. The radiant heat energy of the tympanic member 29 within the ear is directed toward the end surface 21b to cause a temperature change to be sensed by the field effect element 13.

A diagrammatic representation of the human ear is shown in FIGURE 5, and includes the mathematical symbols used to derive at the proper heat transfer relationship between the tympanic member through the ear canal and on to the heat sensing probe. For a better understanding of the mathematical derivations shown in FIGURE 5, the following explanation is given.

A small quanity of heat $\Delta Q$ flows into the field effect header. The resulting rise in temperature $\Delta T$ will be given by the equation $\Delta Q = C \Delta T$; therefore in our case the quantity $C$ we will call the thermal capacity of the field effect header. Thus $$C = \frac{\Delta Q}{\Delta T}$$

If the probe of the thermometer was an isolated body and not in contact with the cavitation of the ear, the problem would be very simple. The isolated body would simply be equal to the mass of the body times its specific heat, and is usually expressed in joules per degree.

Since the probe is in contact with the thermally conducting medium within the cavitation of the ear, it will be assumed that the probe of the $\Delta T$ thermometer is at a temperature $\Delta T$ above its surroundings, and let us assume it to have infinite thermal capacity and to be at a uniform temperature T.

If $\Delta T$ is small, the rate of flow of heat $\Delta \omega$ from the field effect header to the surrounding medium in the cavity of the ear, will be proportional to $\Delta T$, and we may write $\Delta \omega = \mathcal{G} \Delta T$ thus we will call the quantity $\mathcal{G}$ the thermal conductance of the body to its surroundings of the inner portion of the ear.

We will also use the quantity $\mathcal{R}$ which is the reciprocal of $\mathcal{G}$ and will be called the thermal resistance between the field effect header in the top epicenter of the probe with respect to the surroundings of the medium inside the cavitation of the ear.

Since the field effect header is thermally connected to the surrounding of the medium within the cavity of the ear, the external source of heat generated within the pocket of the ear from the tympanic membrance causes a flow at rate $\omega$ into the field effect header which is located in epicenter aft of the probe, we have then for $\Delta T$ the expression $$C \frac{d \Delta T}{dt} + \mathcal{G} \Delta T = \omega$$

In general $\omega$ may be a function of the time $t$. If $\omega$ is constant we simply have $\Delta T = \mathcal{R} \omega$, temperature difference being independent of the capacity $\mathcal{C}$. Where $\omega$ is a periodic function of the time, $\omega$ is given by $$\omega = \omega_0 \cos 2\pi f t$$

As in usual in dealing with such problems they are written in complex form, and the equation becomes $$\mathcal{C}\frac{d\Delta T}{dt} + \mathcal{G}\Delta T = \omega_o e^{j\omega t}$$

where $\omega$ is written for $2\pi F$.

The solution consists of a transient term of the form $$\Delta T = \Delta T_o e^{-\frac{t}{\tau}}$$

which rapidly dies out, together with a periodic term given by $$\Delta T = \frac{\mathcal{R}\, \omega_o e^{j\omega t}}{1 + j\,\mathcal{R}\,\mathcal{C}\,\omega}$$

The amplitude of the response $|\Delta \alpha|$ is given by $$|\Delta T| = \frac{\mathcal{R}\,\omega_o}{(1+\omega^2 \tau^2)^{1/2}}$$

It is noted that for low frequencies such that $\omega \ll 2^{-1}$ the amplitude of the response is the same as for a steady input but that it falls off as the frequency is increased. For high frequencies such that $\omega \gg \lambda^{-1}$ the response falls off as $f^{-1}$ increases. The thermal admittance of our probe is given by $\mathcal{A}=\mathcal{G}+j\omega C$. The reciprocal of $\mathcal{A}$ will be written as $\mathcal{Z}$ for the thermal impedance. Therefore, $$\Delta T = \frac{\mathcal{R}\,\omega_o e^{j\omega t}}{1+j\,\mathcal{R}\,\mathcal{C}\,\omega}$$

then becomes $\Delta T = \mathcal{Z}\omega_o e^{j\omega t} = \mathcal{Z}\omega$. Thus, from the laborious calculations an analogy with thermal and electrical quanties the following relations are given:

$\Delta T$ Temperature difference $\leftrightarrow$ voltage $v$
$\omega$ Rate of flow of heat $\leftrightarrow$ current $i$
$C$ Thermal capacity $\leftrightarrow$ electrical capacity $c$
$\mathcal{R}$ Thermal resistance $\leftrightarrow$ electrical resistance $R$
$\mathcal{A}$ Thermal admittance $\leftrightarrow$ electrical admittance $A$ The value of the resistance $\mathcal{R}$ will depend on the means by which the field effect header is thermally connected to the epicenter of the window of the probe with its immediate surroundings within the vicinity of the tympanic membrane situated within the cavity of the innermost portion of the ear. Under certain conditions $\mathcal{R}$ may be calculated from the fundamental thermal constants of the field effect header. To calculate $\mathcal{R}$ in the simplest possible case, that of a perfect black body connected with its surroundings by radiation only. It will be noted that if the field effect header and probe is at a small $\Delta T$ above that of its surroundings the net flow of heat from the field effect header and probe will be given by $\omega = 4\mathcal{A}\sigma E T^3 \Delta T$ so that $\mathcal{G} = 1/\mathcal{R} = 4\sigma A T^3$ where A is the surface area of the field effect header which is approximately $1.016 \times 10^{-3}$ cm.$^2$. The thermal resistance as well as the capacity may therefore be taken as constants for any given temperature and are independent of the frequency. For a body such as a field effect header which is not perfectly black, the equation $$F_v d_v = \frac{8\pi h}{c^2}\frac{v^3 \epsilon^1(T_1 V)}{e^{\frac{hv}{KT}}-1}\,dv$$

is used, where $F_v d_v$ is the flux of energy per unit area of frequencies between $v$ and $v+dv$, and integrate over all frequencies. For total rate of flow of heat $\omega(T)$ in radiation emitted from the body of the field effect header we have $$\omega(T) = \frac{2\pi A h}{c^2} \int_0^\infty \frac{v^3 \epsilon^1(TV)}{e^{\frac{hv}{KT}}-1}\,dv$$

we then will have $$\mathcal{R}^{-1}\Delta T = \omega(T+\Delta T) - \omega(T)$$

and $$\frac{1}{\mathcal{R}} = \frac{dw(t)}{dT}$$

If the emissivity $\epsilon^1$ may be regarded as independent of T, R may be written in the simple form $$\frac{1}{\mathcal{R}} = \frac{2\pi h^2 A}{c^2 K T^2}\int_0^\infty \frac{v^4 \epsilon^1(v) e^{hv/KT}}{\left(e^{\frac{hv}{KT}}-1\right)^2}\,dv$$

if $\epsilon^1$ is constant we simply have $1/R = 4\sigma\epsilon^1 A T^3$.

Now consider the effect of heat conduction through the structure supporting the field effect header and through a surrounding gas, air within the cavitation of the ear. Let the thermal conductance due to conduction by various means be $\mathcal{G}_{c1}$, $\mathcal{G}_{c2}$ ... etc., these will be effectively in parallel with that due to radiation $\mathcal{G}_r$ so that we have $$\mathcal{G} = \mathcal{G}_r + \mathcal{G}_{c1} + \mathcal{G}_{c2} + \cdots$$

we can see that the value of $\mathcal{R}$ will be decreased by the effect of conduction.

There is another feature of conduction which is of some interest to the present approach of the subject at hand. The thermal conductance $\mathcal{G}_r$ due to radiation is independent of frequency. While the thermal conductance due to conduction may, however, be highly frequency independent. Conduction also increases the effective capacity of a body such in our case a field effect header. Thus $$\mathcal{A} = (\mathcal{G}_r + \mathcal{G}_c) + j\omega(\mathcal{C}_o + \mathcal{C}_c),$$

where $\mathcal{C}_o$ is the thermal self-capacity of the field effect header in the absence of conduction, and $\mathcal{C}_c$ is the additional capacity due to conduction since the field effect header is a plane body of area A ($1.016 \times 10^{-3}$ cm.$^2$) in contact with a medium of thermal conductivity K and diffusivity $\eta$ ($\eta = K/S\rho$), where S is the specific heat and $\rho$ the density. Fow of heat from $\Delta T$ probe through the medium is governed by the diffusion equation $$\frac{\partial T}{\partial t} = \eta \nabla^2 T$$

For simplicity sake, consider only one-dimensional flow, thus the above said equation shall become $$\frac{\partial T}{\partial t} = \frac{\eta \partial^2 T}{\partial \mathcal{G}^2}$$

where $\mathcal{G}$ is a distance measured normally from the body of the field effect header.

Now consider an imaginary condition somewhat like our thermal conduction probe of one-dimensional flow conditions. Conduction down a uniform rod of cross-sectional area A and length L which joins a body (field effect) to a perfectly conduction field effect heater (heat sink) at say temperature $T_o$. Let us now write $$T = T_o + \Delta T$$

thus $$\frac{\partial T}{\partial t} = \frac{\eta \partial^2 T}{\partial \mathcal{G}^2}$$

now becomes $$\frac{\partial \Delta T}{\partial t} = \eta \frac{\partial^2 \Delta T_1}{\partial \mathcal{G}^2}$$

which is the distance measured from the body along the rod. We must now find a solutation for $$\frac{\partial \Delta T}{\partial t} = \eta \frac{\partial^2 \Delta T}{\partial \mathcal{G}^2}$$

so that $\Delta T$ has a prescribed value $T_o$ at $\mathcal{G}=0$ and is zero at $y=L$. For steady conditions the left-hand side of $$\frac{\partial \Delta T}{\partial t} = \eta \frac{\partial^2 \Delta T}{\partial \mathcal{G}^2}$$

is zero and the appropriate solution is simply $$\Delta T = \Delta T_o \left( L - \frac{y}{L} \right)$$

The rate of flow of heat from the body $\Delta \omega$ is given by $$\Delta \omega = -AK \frac{(\partial \Delta T)}{\partial \mathcal{G}} \quad \mathcal{G}=0$$

where K is the thermal conductivity. We have therefore $$\Delta \omega = AK\Delta T/L \quad \mathcal{G}_c = KA/L$$

FIGURE 6 is a diagrammatic representation showing the operation of a field effect transistor element as used in accordance with the principles of this invention.

FIGURE 6a illustrates the depletion area between the two P type junctions 23 and 24 when no bias is applied to the field effect element. However, with the proper bias applied to the field effect element, specifically voltage is applied to the gate and the drain thereof, the depletion area between the P type junctions exhibit a change in channel width through the junction, as seen in FIGURE 6b. With the proper amount of bias applied to the field effect element, the depletion area of one P type junction can be made to engage the depletion area of the other P type junction thereby completely cutting off the channel through the field effect element. According to the present invention, the field effect transistor element is operated in the mode of operation shown in FIGURE 6c such that increases in temperature as sensed by the field effect element will tend to open the channel and allow current to flow therethrough. Therefore, by incorporating a balanced feed-back network to increase the voltage applied to the gate and drain the channel through the field effect element will again be closed thereby balancing the electronic circuitry.

According to this invention, it has been found that when the gate junction is short circuited to the source junction of the field effect transistor element, the current flowing through the channel of the field effect transistor will vary substantially proporational with temperature. Also, the time required for such variations to take place is relatively small and is proporational to the size of the field effect transistor element. Therefore, it is highly desirable that the field effect transistor element 13 be constructed as small as possible so that a small amount of heat energy is sufficient to cause the necessary temperature rise in a short period of time. For example, the field effect transistor element 13 may have a dimension of approximately eight thousandths of an inch thick and twenty thousandths of an inch in diameter. Also the approximate mass of the field effect transistor element is $1.967 \times 10^{-5}$ grams. It will be understood that other dimentions of size and mass may be used without departing from the novel concepts of this invention.

For a better understanding of the cooperation of the field effect element with that of its associated electronic circuitry reference is now made to FIGURE 7. The field effect transistor 13 has its lead 16 connected to a circuit point 30 which is a summing junction of the current from the field effect element 13 and the feed-back current from an amplifier 31. Also, the circuit point 30 is the signal input terminal for the amplifier 31. Connected to the circuit point 30 is a variable resistance network 32 which has its other end connected to a Zener diode 33. Also connected to the Zener diode 33 is a negative voltage source 34 through a push button switch 36, line 37 and a resistor 38. Therefore, the negative voltage source 34 applies a regulated voltage to the input of the amplifier 31 for circuit stability.

A positive voltage source 39 is connected through the push button switch 36 through a line 40 to a circuit point 41, which is a power source input of the amplifier 31, and drain electrode of the field effect transistor 13. Also connected to the circuit point 41 is the movable contactor of a potentiometer 42 which has the extreme ends of the resistance element thereof connected to terminals 43 and 44 of the amplifier 31. Also connected to terminals of the amplifier 31 are a pair of compensating capacitors 46 and 47.

The output of the amplifier 31 is delivered to a circuit point 48 through a line 49 and therefrom to a read-out device, such as a meter 50. Although the meter 50 is preferably a milliammeter, it will be noted that the meter face may be calibrated in degrees Fahrenheit. A feed-back circuit comprising a variable resistance network 51 is connected between the circuit point 48 and the circuit point 30. Variations in current flow through the field effect element 13 will cause an increase in current flow through the output of the amplifier 31, which output current is then delivered back to the field effect element 13 and circuit point 30 to again balance the circuit.

The amplifier 30 is a commercially available monolithic operational amplifier which incorporates linear integrated circuits. Such amplifiers are identified by Union Carbide under Parts Nos. UC4000, UC4001 and UC4002.

The circuit arrangement shown in FIGURE 7 is adapted to be operated from an external direct current power source which can derive the desired voltage potentials from a rectified alternating current voltage. The external power source is connected to terminals 52 and 53 which are connected to the push button switch 36. Also, this circuit arrangement allows rechargeable batteries to be used as power sources 34 and 39 and which batteries would be recharged when the apparatus is connected to a rectified source of alternating current voltage.

A test switch 54 is provided to enable the operator of the apparatus to periodically check the actual potential of the power sources 34 and 39. The selector switch 54 is shown in the operational position to give an indication of the temperature sensed by the field effect element 13. However, by moving the movable contractors of the switch to engage the resistor 56 and the ground line 57 the meter will give an indication of the potential of the positive power source 39. Similarly, when the movable contactor is moved to engage the resistor 58 and ground line 59 the meter 50 will give an indication of the potential of the negative power source 34. The power source 34 and 39 are connected together at a common ground line 60.

Seen in FIGURE 8 is an alternate arrangement of the electronic circuitry used in the temperature sensing device of the present invention. The field effect transistor 13 has the drain electrode thereof connected to a movable contactor 60 of a ganged together switch 61. The gate source junction is connected to a circuit point 62 which is a summing junction of the circuit. Also connected to the gate source junction of the transistor 13 is a negative voltage source through a movable contactor 63 and a variable resistance voltage divider network 64. The circuit point 62 is connected to a signal input terminal of the operational amplifier 31 and the output of the operational amplifier 31 is connected to a meter 66 through a variable resistance 67. Also connected to the output of the operational amplifier 31 is a feed-back network 68 which may include a variable resistance element 69. However, it will be understood that the variable resistance element may be eliminated and only a fixed resistance used in the feed-back network.

A compensating network 70 comprising a pair of capacitors 71 and 72 and a resistor 73 is connected to the operational amplifier for high frequency compensation. A positive voltage source 74 is connected to the positive input terminal of the operational amplifier 31 through a switch 76 and a line 77. Similarly, a negative voltage source 78 is connected to the negative input terminal of the operational amplifier 31 through a switch 79 and a line 80. Also connected to the switches 76 and 79 is an alternating current rectifier circuit 81 through a pair of switches 82 and 83. When the device is to be operated from the battery sources 74 and 78 only the switches 76 and 79 are closed to energize the circuit. However, when the device is operated from a source of alternating current voltage, switches 76 and 79 together with switches 82 and 83 are closed simultaneously. Also, switches 82 and 83 complete the circuit between the rectifier circuit 81 and the batteries 74 and 78 to recharge the batteries.

The battery sources 74 and 78 are connected to a ground line 84 and to stationary contacts 86 and 87 associated with the movable contacts 60 and 63 respectively. When the device is not in operation, the movable contacts 60 and 63 engage the stationary contacts 86 and 87 respectively to short circuit the field effect transistor 13 thereby preventing unnecessary current flow from passing through the field effect transistor. The voltage delivered to the temperature sensing circuit is voltage regulated by a pair of Zener diodes 90 and 91 between the ground line and the positive potential source 74 and by a pair of diodes 92 and 93 between the ground line and the negative source 78. The Zener diodes 91 and 93 are temperature compensated diodes to insure stability of the circuit over various ambient temperature ranges.

Connected to the Zener diode 91 is a resistor 96 which, in turn, is connected to a potentiometer 97 and a resistor 98 back to the anode of the Zener diode 93. Therefore, resistors 96, 97 and 98 connect the regulated positive voltage to the regulated negative voltage. The movable contactor of potentiometer 97 is connected through a resistor 99 to an input terminal of the operational amplifier 31. Also connected to the input terminal together with resistor 99 is a resistor 100 which has its other end connected to ground potential. The potentiometer 97 is adjusted to produce a zero current flow at the summing junction 62 when the Zener diode senses a known temperature of 94° Fahrenheit. The potentiometer 67, connected between the output of the operational amplifier 31 and the meter 66, is preadjusted so that the meter 66 produces a zero to five volt meter reading between 94° and 108° Fahrenheit.

For a better understanding of the cooperation between the amplifier circuit and the field effect element to function as a linear temperature sensing device, the following explanation is given:

The transducer is double diffused N channel field effect transistor. It is operated in the saturated mode, i.e. the gate and source are shorted together. The saturated on-resistance of the field effect is designated "RON," and the maximum current which can pass from source to drain is designated "IDSS," and the voltage from drain to source "VDS," and if VDS/RON is much greater than IDSS then $$\frac{\Delta IDSS}{\Delta VDS} \to 0$$

if $\Delta VDS$ is small.

Therefore, IDSS is not greatly dependent on VDS, but IDSS is a very strong function of temperature. A simple equation which describes dIDSS/dt within the temperature range and accuracy with which we are concerned is $$\frac{dIDSS}{dT} = \frac{1 d\mu IDSS}{\mu dT} + g_{max} \cdot \frac{dVp}{dT}$$

where $1 d\mu/\mu dT$ is by definition the temperature coefficient of the mobility of holes or electrons in silicon, $g_{max}$ is the transconductance of the device at 25° C. and IDSS, and Vp is the pinch-off voltage of the field effect. From the equation for $dIDSS/dT$ it is apparent that by selection of values for IDSS, $g_{max}$, and Vp, $(dIDSS)^2/d^2T$ will approach zero, hence we have a linear transducer.

At 94.0° F. the null current sources and IDSS of the field effect are equal and opposite, and when connected to a common node they would cancel each other. The common node is circuit point 42 and is the summing junction of operational amplifier 44. If the temperature of the field effect is raised some ΔT an IDSS current is produced and this IDSS current must be supplied by the amplifier to keep the sum of the currents at the node equal to zero. IDSS must pass through Rf resistor 48, so we have a voltage $E_0$ equal to $\Delta IDSS \times R_f$.

For a better understanding of the mathematical properties involved in the present invention, the following explanation is given to enable one to extend the teachings of this invention to other related fields.

Total radiation emitted by a plane object (black body) of emissivity .97 at 32° C. to 42° C. with an area of $1.016 \times 10^{-3}$ cm.² is as follows:

The total black body radiant emittance is obtained by $I = \sigma T^4$.

Infrared radiation like visible light is an arbitrarily specified part of electromagnetic radiation. The only physical difference between the two is the wave length. Conceptually the physics underlying the nature of the radiation has profound depth and implications, but for the purposes of understanding infrared radiation, it is only necessary to know a small portion of the ideas. The basic law derived by Planck in 1901, prescribes the power per unit of area per unit wave length interval of a perfect emitter called a black body as $$\omega_\lambda = 8\pi c^2 h \lambda^{-5} \left( e^{-\frac{hc}{\lambda KT}} - 1 \right)$$

The quantity $\omega_\lambda$ is called the spectral radiant emittance. A somewhat simpler form is $$\omega_\lambda = C_1 \lambda^{-5} (e^{c_2/\lambda T} - 1)^{-1}$$

Here, all the constants have been collected into $C_1$, and $C_2$; it can be seen that the radiation in a narrow wave length band $\omega_\lambda$ varies with the wave length and with temperature. Clearly the total radiant emittance $\omega$ which comes from a perfect radiator is obtained by summing the radiation in every small spectral interval, that is by integrating $\omega_\lambda$ from zero to infinity; the radiant emittance in any spectral interval $\omega_{\Delta\lambda}$ is obtained by integrating the Planck equation over the proper limits.

$$\omega \Delta\lambda = \int_{\lambda_2}^{\lambda_1} \omega_\lambda d_{\lambda_1} \Delta\lambda = \lambda_2 - \lambda$$

The maximum of the black body is determined by the Wien Displacement Law. $\lambda_{max}T = 2{,}897\mu -$° K. The calculations are usually difficult enough that special tables and computational aids are used. Fortunately, the total radiant power density $\omega$ is given simply: $\omega = \sigma T^4$.

Further $\omega \Delta\lambda$ can usually be written as $\sigma T^\eta$ where $\eta$ is determined by the part of the curve being considered. In both cases $\sigma$ is the Stefan-Boltzmann constant, T is the absolute temperature and $\omega$ is usually stated in terms of watt cm.$^{-2}$ or equivalent units like cal. sec.$^{-1}$ cm.².

These are the fundamental radiation equations for perfect radiators. Natural radiators are not perfect; their degree of perfection is characterized by a radiation efficiency factor called emissivity $\epsilon$. A perfect radiator has an emissivity of one. Thus, the Stefan-Boltzmann radiation equation must be rewritten: $\omega = \epsilon \sigma T^4$.

By the theory just presented it is clear that everything around is more or less luminous in the infrared. All objects radiate to each other, the net radiation passing from warmer to cooler objects consonant with the third law of thermodynamics.

If the total emitted power throughout the spectrum is measured it may be expressed as $W_{total} = \epsilon \sigma T^4$. Instruments, however, generally operate within restricted wave length intervals, depending upon the spectral characteristics of the detectors employed, and for an infinitely narrow-spectral-band instrument operating at same specific wave length $\lambda \omega_\lambda = K E_\lambda T^\eta$, where K is a proportional factor. From this equation, we can see that it will take an $\eta$ percent error in $\epsilon_\eta$ to cause a one percent error in the value of T computed from an experimental measurement $\omega_\lambda$. In order, therefore, to understand the relative importance of $\epsilon_\lambda$ and T, we must know the value of $\eta$ at each wave length.

To determine the spectral dependence of $\eta$ for the emission of a black body at a temperature T, we must first compute $\lambda_{max}$, and then a factor $$B = \frac{\eta}{\eta_{max}}$$

In a thorough treatment of this subject, for wave lengths longer than 2.5 $\lambda_{max}$, $$\eta \approx 1 + \frac{2.5}{B}$$

and (b) for wave lengths shorter than 2.5 $\lambda_{max}$, $\eta = 5/B$. Experimentally, wave lengths greater than 2.5 $\lambda_{max}$ are very seldom used, so we are normally concerned only with the relationship given (b), and one computation should serve to illustrate this clearly. For a black body at 300 K. $\lambda_{max}$ is approximately equal to $10\mu$. Thus for a narrow-spectral-band instrument operating at $5\mu$, $B = 5/10 = 0.5$, and it follows then $\eta = 5/0.5 = 10$.

Only 10 percent of the radiation from the human body lies below $7\mu$. The emissivity of skin is probably very close to one and very nearly constant from $7-14\mu$ although it seems to show appreciable reflectivity at shorter wave lengths. The spectral region in question has good atmospheric transmission and it can also be shown that the position or wave lnegth of maximum radiation difference resulting from a temperature difference is given by $$\lambda_{max} T = 5,1000\mu - °K.$$

This gives an $\eta_{max}$ for body temperature of $17\mu$.

Although the temperature sensing device of the present invention has been shown as having particular utility when used as a thermometer for recording body temperatures, it will be understood that the temperature sensing device of the present invention has a wide variety of uses. For example, a temperature sensing device of the present invention may be used in fire alarm systems, microwave power measurement, gas chromatography and thermal conductivity gas analysis, and sensing the internal temperature of nuclear reactions to mention a few. Accordingly, it will be understood that in view of the full and complete teaching of the environmental surroundings of the present invention that variations and modifications may be effected without departing from the spirit and scope of the novel concepts of this invention.

I claim as my invention:

1. A temperature measuring device including:
an amplifier having input and output terminals:
a read-out device connected to the output terminals of said amplifier;
the improvement therein comprising, a field effect semiconductor element connected to the input terminals of said amplifier and arranged to be positioned in proximity with an object to sense the temperature thereof, whereby variations in temperature sensed by said field effect element will cause a corresponding change in current flow through said field effect element to produce an indication at said read-out device of the temperature of the object, further including a feedback resistor connected between said output and input terminals, and a negative polarity power source connected to the input terminals of said power source, whereby current from said negative polarity power source through said field effect element is combined with the current from said feedback resistor to produce a null at the input of said power amplifier source thereby causing said amplifier to be linear.

2. A temperature measuring device including:
an amplifier having input and output terminals;
a read-out device connected to the output terminals of said amplifier, the improvement therein comprising, a field effect semiconductor element connected to the input terminals of said amplifier and arranged to be positioned in proximity with an object to measure the temperature thereof, whereby variations in temperature sensed by said field effect element will cause a corresponding change in current flow through said field effect element to produce an indication at said read-out device of the temperature of the object, further including a feedback resistor connected between the input and output terminals of said amplifier, and a negative polarity power source connected to the input of said amplifier, whereby current from said negative polarity power source passes through said field effect element and the current through said feedback resistor is combined therewith at the input of said amplifier to produce a null thereby causing said amplifier to be a linear amplifier, and further including a heater element positioned adjacent said field effect element to preheat said field effect element to the approximate temperature which is to be measured.

3. A temperature measuirng device including:
an amplifier having input and output terminals,
a read-out device connected to the output terminals of said amplifier, the improvement therein comprising,
a field effect semiconductor element connected to the input terminals of said amplifier and arranged to be positioned in proximity with an object to measure the temperature thereof, whereby variations in temperature sensed by said field effect element will cause a corresponding change in current flow through said field effect element to produce an indication at said read-out device of the temperature of the object, wherein said field effect element is mounted in a probe, said probe including a mounting plate to receive said field effect element and a cover positioned over said field effect element and circuit means connecting said probe to said amplifier,
said mounting plate integrally formed with said cover, the extended potrion of said probe has a dish-shaped surface, and
said object supplying radiant heat energy toward said dish-shaped surface which is concentrated at a relatively small area adjacent said field effect element.

4. A temperature measuring device according to claim 3 further including a heater element positioned adjacent said field effect element to preheat said field effect element to preheat said field effect element to the approximate temperature being measured.

5. A temperature sensing probe comprising:
a mounting plate,
a field effect semiconductor element secured to said mounting plate and arranged to be connected to a source of power,
a cover secured to said mounting plate and over said field effect element,
said cover includes a concave surface for receiving radiant energy and concentrating said radiant energy at a relatively small area on said concave surfce, and wherein said field effect semiconductor element is secured to the interior of said cover opposite said concave surface.

6. A temperature sensing probe comprising, in combination, a field effect semiconductor element as a temperature sensing element, means supplying power to said field effect element such that variations of temperature sensed by the field effect element will cause corresponding variations in current flow therethrough from said means for supplying power, said field effect semiconductor element includes a gate electrode, a source electrode and a drain electrode, and wherein said gate and source electrodes are connected together.

7. A temperature sensing probe according to claim 6 wherein the power supplied to said field effect element is sufficient to prevent current flow through the field effect element between a temperature range of 32° and 180° Fahrenheit.

8. A temperature sensing probe according to claim 7 wherein the power supplied to said field effect element is sufficient to prevent current flow therethrough between a temperature range of 80° to 100° Fahrenheit.

9. A temperature sensing probe according to claim 6 wherein the power supplied to said field effect element is sufficient to prevent current flow through the field effect element between a temperature range of minus 65° centrigrade to 200° centigrade.

References Cited

UNITED STATES PATENTS

| | | | |
|---|---|---|---|
| 2,811,856 | 11/1957 | Harrison | 73—355 |
| 2,871,330 | 1/1959 | Collins. | |
| 3,076,339 | 2/1963 | Barton. | |
| 3,282,106 | 11/1966 | Barnes | 73—355 |
| 3,294,988 | 12/1966 | Packard | 307—304 XR |

OTHER REFERENCES

White, A. G.: A Note on the Transistor as a Thermometer. In the Journal of Scientific Instruments, vol. 32, November 1955, pp. 451–2.

Amelco Semiconductor Division of Teledyne, Inc.; Field Effect Transistors—Theory and Application Notes, No. 2, June 1962.

LOUIS R. PRINCE, Primary Examiner

F. SHOON, Assistant Examiner

U.S. Cl. X.R.

73—362; 307—304; 317—235.

UNITED STATES PATENT OFFICE
CERTIFICATE OF CORRECTION

Patent No. 3,491,596　　　　　　　　　Dated January 27, 1970

Inventor(s) JAMES M. DEAN

It is certified that error appears in the above-identified patent and that said Letters Patent are hereby corrected as shown below:

Column 2, line 8, "portiton" should read --portion--; line 9, "objects" should read --object--.

Column 6, line 51, "Fow" should read --Flow--.

Column 8, line 53, "contractors" should read --contactors--.

Column 11, line 47, "lnegth" should read --length--.

Claim 3, Column 12, line 40, "measirng" should read --measuring-- line 58, "potrion" should read --portion--.

Claim 4, Column 12, line 66, delete "to preheat said field effect element";

Column 13, line 2, "surfce" should read --surface--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents